(12) United States Patent
Akselrod et al.

(10) Patent No.: US 8,032,338 B2
(45) Date of Patent: Oct. 4, 2011

(54) METHOD AND APPARATUS FOR DESIGN OF A POWER SUPPLY

(75) Inventors: Arkady Akselrod, Santa Clara, CA (US); Sameer Kelkar, Santa Clara, CA (US); Timothy E. W. Starr, San Francisco, CA (US)

(73) Assignee: Power Integrations, Inc., San Jose, CA (US)

( * ) Notice: Subject to any disclaimer, the term of this patent is extended or adjusted under 35 U.S.C. 154(b) by 509 days.

(21) Appl. No.: 12/139,368

(22) Filed: Jun. 13, 2008

(65) Prior Publication Data

US 2009/0313002 A1 Dec. 17, 2009

(51) Int. Cl.
*G06F 17/50* (2006.01)
*G06F 9/45* (2006.01)
*G06F 9/455* (2006.01)
*G06G 7/48* (2006.01)

(52) U.S. Cl. ......... 703/1; 703/3; 703/4; 703/13; 703/14; 703/18; 716/102; 716/103; 716/104; 716/106; 716/109; 716/122; 716/123; 716/132; 716/133

(58) Field of Classification Search ............... 703/1, 2, 703/13, 18, 3, 4, 14; 716/109, 133, 102, 716/103, 104, 106, 122, 123, 132
See application file for complete search history.

(56) References Cited

U.S. PATENT DOCUMENTS

| | | | |
|---|---|---|---|
| 5,519,627 A * | 5/1996 | Mahmood et al. | 716/103 |
| 5,604,892 A * | 2/1997 | Nuttall et al. | 703/18 |
| 5,633,805 A * | 5/1997 | Simonsen | 716/104 |
| 5,754,738 A | 5/1998 | Saucedo | |
| 5,763,907 A * | 6/1998 | Dallavalle et al. | 257/202 |
| 5,802,349 A * | 9/1998 | Rigg et al. | 716/103 |
| 5,956,497 A * | 9/1999 | Ratzel et al. | 716/102 |
| 6,170,079 B1 * | 1/2001 | Kato et al. | 716/102 |
| 6,269,467 B1 * | 7/2001 | Chang et al. | 716/104 |
| 6,490,715 B1 * | 12/2002 | Moriwaki et al. | 716/108 |
| 6,539,533 B1 * | 3/2003 | Brown et al. | 716/112 |
| 6,694,501 B2 * | 2/2004 | Chang et al. | 716/122 |

(Continued)

FOREIGN PATENT DOCUMENTS

DE 19851131 5/1999

(Continued)

OTHER PUBLICATIONS

Carlson, Susan. "Genetic Algorithms Attributes for Component Selection", Research in Engineering Design (1996) 8: 33-51.*

(Continued)

*Primary Examiner* — Kamini S Shah
*Assistant Examiner* — Shambhavi Patel
(74) *Attorney, Agent, or Firm* — Blakely Sokoloff Taylor & Zafman LLP

(57) ABSTRACT

A computer-implemented method for the design of a power supply is disclosed. Multiple lists of power supply design variables are provided. The method includes simulating a first power supply design in response to power supply design variables selected from these multiple lists of variables. The method then calculates a score of the first power supply design and determines whether the score is better than the score of any power supply design included in a set of power supply designs. If so, the method replaces a power supply design having a worst score from the set of power supply designs with the first power supply design.

34 Claims, 16 Drawing Sheets

U.S. PATENT DOCUMENTS

| | | | |
|---|---|---|---|
| 6,698,002 B2* | 2/2004 | Chang et al. | 716/106 |
| 6,701,504 B2* | 3/2004 | Cooke et al. | 716/122 |
| 6,711,720 B2* | 3/2004 | Chen | 716/123 |
| 6,725,432 B2* | 4/2004 | Chang et al. | 716/132 |
| 6,948,145 B2* | 9/2005 | Brown et al. | 716/119 |
| 7,299,446 B2* | 11/2007 | He et al. | 716/103 |
| 7,458,028 B2* | 11/2008 | Chidambaram et al. | 715/736 |
| 7,546,571 B2* | 6/2009 | Mankin et al. | 716/137 |
| 7,681,162 B2* | 3/2010 | Tanaka | 716/125 |
| 7,721,213 B2* | 5/2010 | Chidambaram et al. | 715/736 |
| 2002/0073380 A1* | 6/2002 | Cooke et al. | 716/1 |
| 2002/0188910 A1* | 12/2002 | Zizzo | 716/1 |
| 2004/0172603 A1* | 9/2004 | Collmeyer et al. | 716/1 |
| 2005/0278659 A1* | 12/2005 | Zhang et al. | 716/1 |

FOREIGN PATENT DOCUMENTS

| | | |
|---|---|---|
| EP | 0803964 | 10/1997 |

OTHER PUBLICATIONS

Yeung et al. "Component-Based System for Designing Power Supply of no Expert Knowledge Required", Mar. 2007.*

Fu et al. "Database and Selection Method for Portable Power Sources", Advanced Engineering Materials, 2005, vol. 7, No. 8.*

Carlson, Susan. "Genetic Algorithms Attributes for Component Selection", Research in Engineering Design (1996) 8: 33-51.*

Yeung et al. "Component-Based System for Designing Power Supply of no Expert Knowledge Required", Mar. 2007.*

Fu et al. "Database and Selection Method for Portable Power Sources", Advanced Engineering Materials, 2005, vol. 7, No. 8.*

Wirthlin et al. "Web-Based IP Evaluation and Distribution Using Applets", IEEE Transactions on Computer-Aided Design of Integrated Circuits and Systems, vol. 22, No. 8, Aug. 2003.*

Sundareswaran et al., "Genetic Turning of a Power System Stabilizer", Euro. Trans. Electr. Power 2004; 14:151-160.*

Rao et al. "Optimal Parameters of Rectifier Power Transformer by Intelligent Techniques", The Online Journal on Electronics and Electrical Engineering (OJEEE) vol. 1—No. 1.*

McGarry et al. "A Virtual Prototyping Process for Power Supplies Using an Electronic Design Verification Testing (eDVT) System", 2005.*

Kwong et al. "Case-Based Reasoning Approach to Concurrent Design of Low Power Transformers", Journal of materials Processing Technology, 128 (2002).*

Fin et al. "A Remote Methodology for Embedded Systems Design and Validation", Design Automation for Embedded Systems, 2003.*

Dantas et al. "Multi-objective Memetic Algorithm Applied to the Automated Synthesis of Analog Circuits", 2006.*

Cumbi et al. "Development of an Object-Oriented Knowledge-Based System for Power Electronic Circuit Design", IEEE Transactions on Power Electronics, vol. 11, No. 3, May 1996.*

Carlson-Skalak et al. "Using an Evolutionary Algorithm for Catalog Design", Research in Engineering Design (1998)10:63-83.*

Wang et al. "Expert System Aided Design, Simulation and Optimization of Power Converters" Industrial Electronics, Control and Instrumentation, 1997. IECON 97. 23$^{rd}$International Conference. Nov. 9, 1997, pp. 1016-1021, vol. 3.

Wu et al. "Development of an Integrated CAD Tool for Switching Power Supply Design with EMC Performance Evaluation" IEEE Transactions of Industry Applications. Apr. 1, 1998.

European Search Report, Application No. 09161434.7, mailed Oct. 5, 2009.

European Office Action, Application No. 09161434.7, mailed Oct. 16, 2009.

* cited by examiner

Specification

Stacking
Defines how the outputs will be connected to each other

Outputs:

| Spec Output # | Voltage (V) | Current (A) | Type | User |
|---|---|---|---|---|
| M 1 | 5.00 | 2.00 | AC-Stack | |
| 2 | 12.00 | 1.00 | AC-Stack | |
| 3 | 30.00 | 0.10 | AC-Stack | |
| 4 | 24.00 | 0.10 | DC-Stack | |

3  30.00 V, 3 T
4  24.00 V, 7 T
2  12.00 V, 4 T
1  5.00 V, 3 T

☑ Enable DC Stack

[ OK ]  [ Cancel ]  [ Help ]

METHOD AND APPARATUS FOR DESIGN OF A POWER SUPPLY

TECHNICAL FIELD

This disclosure relates generally to the design of circuits and in particular but not exclusively, relates to the design of power supplies.

BACKGROUND INFORMATION

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power supply or power converter is required to transform the high-voltage AC power to low-voltage DC power. The low-voltage DC power may be provided by the power supply directly to the device or it may be used to charge a rechargeable battery that, in turn, provides energy to the device, but which requires charging once stored energy is drained. Typically, the battery is charged with a battery charger that includes a power supply that meets constant current and constant voltage requirements required by the battery. In operation, a power supply may use a controller to regulate output power delivered to an electrical device, such as a battery, that may be generally referred to as a load. More specifically, the controller may be coupled to a sensor that provides feedback information of the output of the power supply in order to regulate power delivered to the load. The controller regulates power to the load by controlling a power switch to turn on and off in response to the feedback information from the sensor to transfer energy pulses to the output from a source of input power such as a power line.

One of the items often included in power supplies is a transformer. A voltage is usually applied to the transformer from one part of the power supply circuit (often referred to as the primary side) and the transformer transfers energy from that part of the power supply circuitry to another part of the power supply circuitry (often referred to as the secondary side). The transformer provides the galvanic isolation and also shifts the voltage level between the primary side and secondary side of the power supply. More specifically, galvanic isolation occurs when DC current is unable to flow between the primary and secondary sides of the power supply.

The design and construction of power supplies as well as the transformers that are used in the power supplies can be a very complicated and complex task due to many factors and variables. The complexity is further increased if the power supply is to include multiple outputs. For example, the design and construction of power supplies is often done through experimentation, on a trial and error basis in order for the power supply designer to realize a power supply design having the desired specifications with regard to electrical performance and cost.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 6 is a diagram illustrating an example user interface for displaying an output list of power supply designs, in accordance with the teachings of the present invention.

FIG. 8 is a diagram illustrating an example user interface for displaying design results of a power supply design, in accordance with the teachings of the present invention.

FIG. 10 is a diagram illustrating an example user interface for displaying a stacking arrangement of the outputs of the power supply, in accordance with the teachings of the present invention.

DETAILED DESCRIPTION

Figure 1:
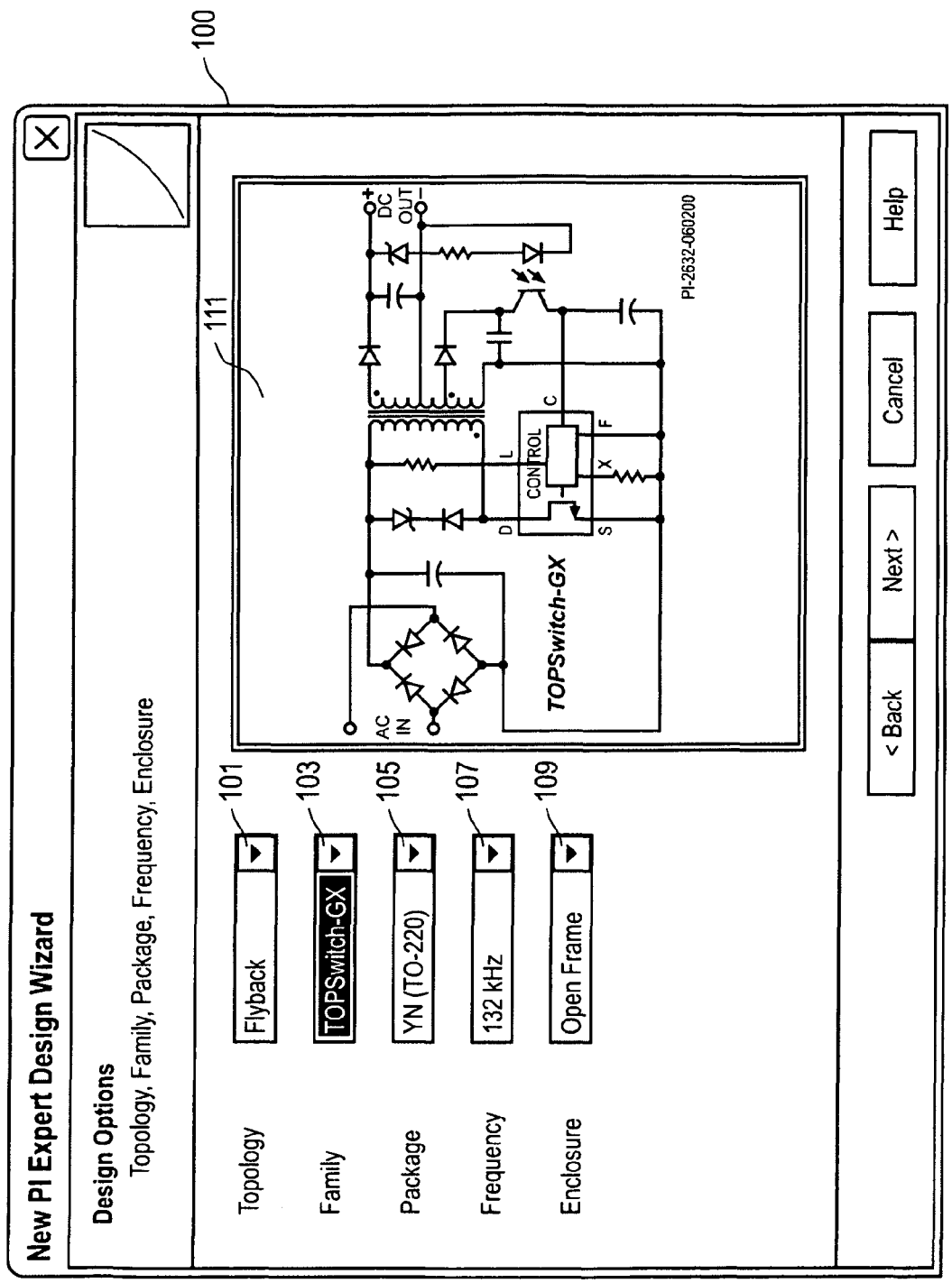
FIG. 1 is a diagram illustrating an example user interface for inputting power supply specifications, in accordance with the teachings of the present invention.

Methods and apparatuses for the design of a power supply are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention.

Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

In short, embodiments of the present invention include methods and apparatuses for the design of a power supply. In one example, the method is realized as design software executing on a computer. A user may begin by providing input specifications corresponding to a desired power supply design. The design software then proceeds with generating multiple lists of power supply design variables, including such lists as lists of viable output diodes, lists of transformer core types, and lists of secondary turns of the transformer. The complexity of the design may further increase as additional outputs are added to the power supply design. The design software proceeds with simulating multiple power supply designs using various combinations of power supply design variables selected from the generated lists. The user can designate a maximum number of power supply designs to keep in an output list. As the design software processes through multiple power supply designs it maintains the output list containing the "best" power supply designs. As better power supply designs are found, low scoring designs are removed from the output list and replaced with the higher scoring designs. It is in this manner of the design software maintaining only a limited number of power supply designs in the output list throughout the simulation of multiple combinations that drastically increases the speed and saves memory with which the design software can derive desirable designs for the user. Furthermore, in one example the design software may iterate through every possible combination of viable design variables to ensure that the power supply designs based on a users' priorities are determined. These and other embodiments are described in detail below.

FIG. 1 is a diagram illustrating an example user interface 100 for inputting power supply specifications, in accordance with the teachings of the present invention. The illustrated example of user interface 100 includes a topology input region 101, a controller family input region 103, a package input region 105, a frequency input region 107, an enclosure input region 109, and a circuit display 111.

In general, user interface 100 provides a user with the ability to input certain design specifications for a desired power supply. In one example, topology input region 101 may allow a user to select between a variety of topologies of power supplies (e.g., flyback, forward, buck, etc.). Family input region 103 allows a user to select from a variety of power supply controllers suitable for use with the currently selected topology. Package input region 105 is configured to allow a user to select the package type of the currently selected controller (e.g., dual inline package (DIP), surface mount device (SMD), etc.). Frequency input region 107 allows the user to select the switching frequency of the currently selected controller (e.g., TOPSwitch-GX). Enclosure input region 109 allows a user to select the enclosure type of the currently selected controller. For example, as shown in FIG. 1, an open frame enclosure is selected. By way of example, an open frame enclosure is one where the circuitry included in the power supply is exposed to its surroundings.

Also illustrated as included in user interface 100 is circuit display 111. In one example, circuit display 111 is responsive to the user input by way of user input controls 101-109. For example, as shown in FIG. 1, circuit display 111 displays a circuit diagram representing the currently selected flyback power supply topology with the currently selected power supply controller.

Figure 2:
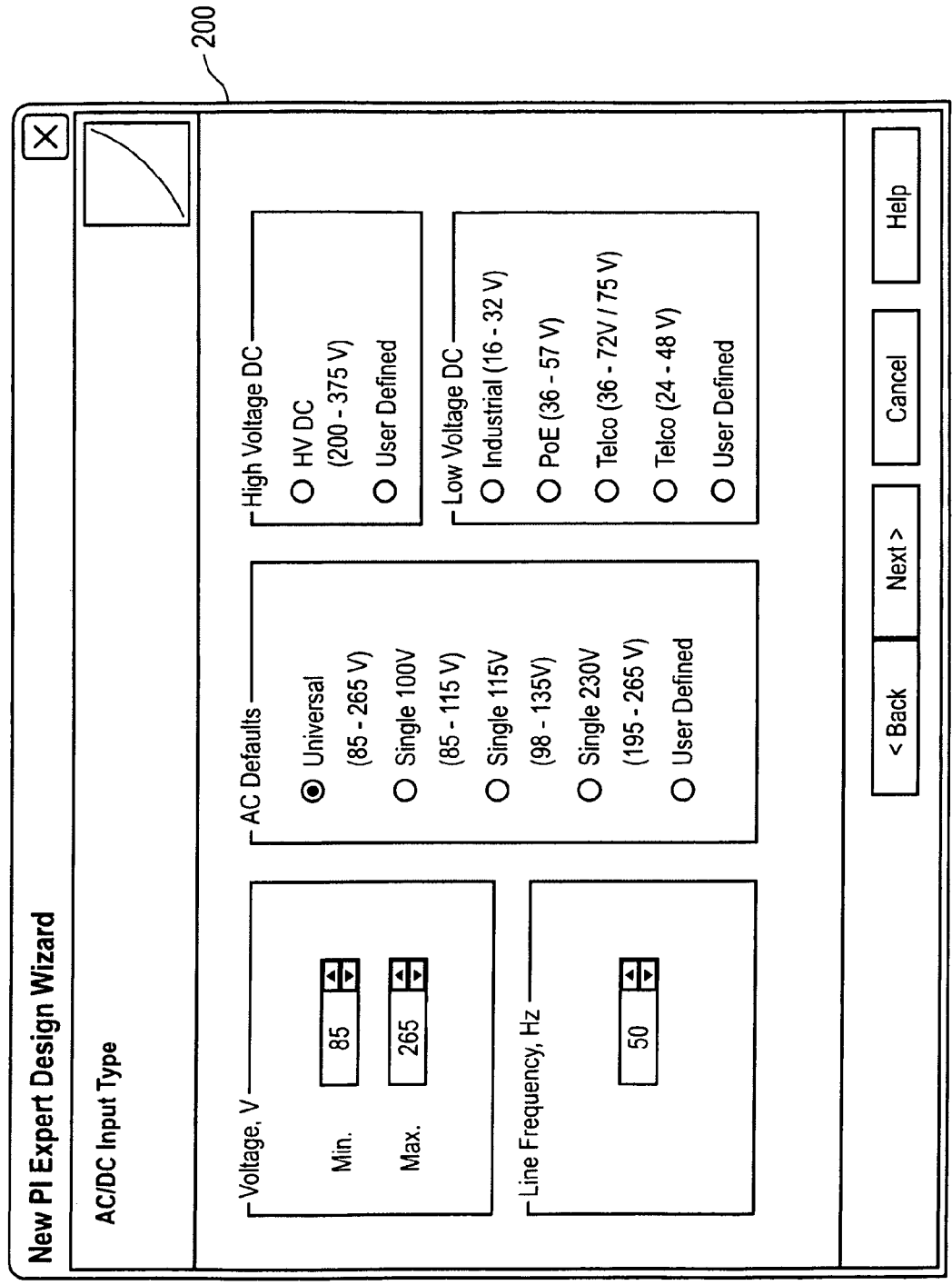
FIG. 2 is a diagram illustrating an example user interface for inputting power supply specifications, in accordance with the teachings of the present invention.

FIG. 2 is a diagram illustrating an example user interface 200 for inputting power supply specifications, in accordance with the teachings of the present invention. Example user interface 200 allows the user to specify the power supply input conditions for voltage and frequency. For example, as shown in FIG. 2, a user may select the minimum and maximum operating voltages at the input of the power supply, as well as the input line frequency, the AC default voltages, and the type of High Voltage DC or alternatively, the type of low voltage DC (e.g., Industrial, PoE, Telco, etc.).

Figure 3:
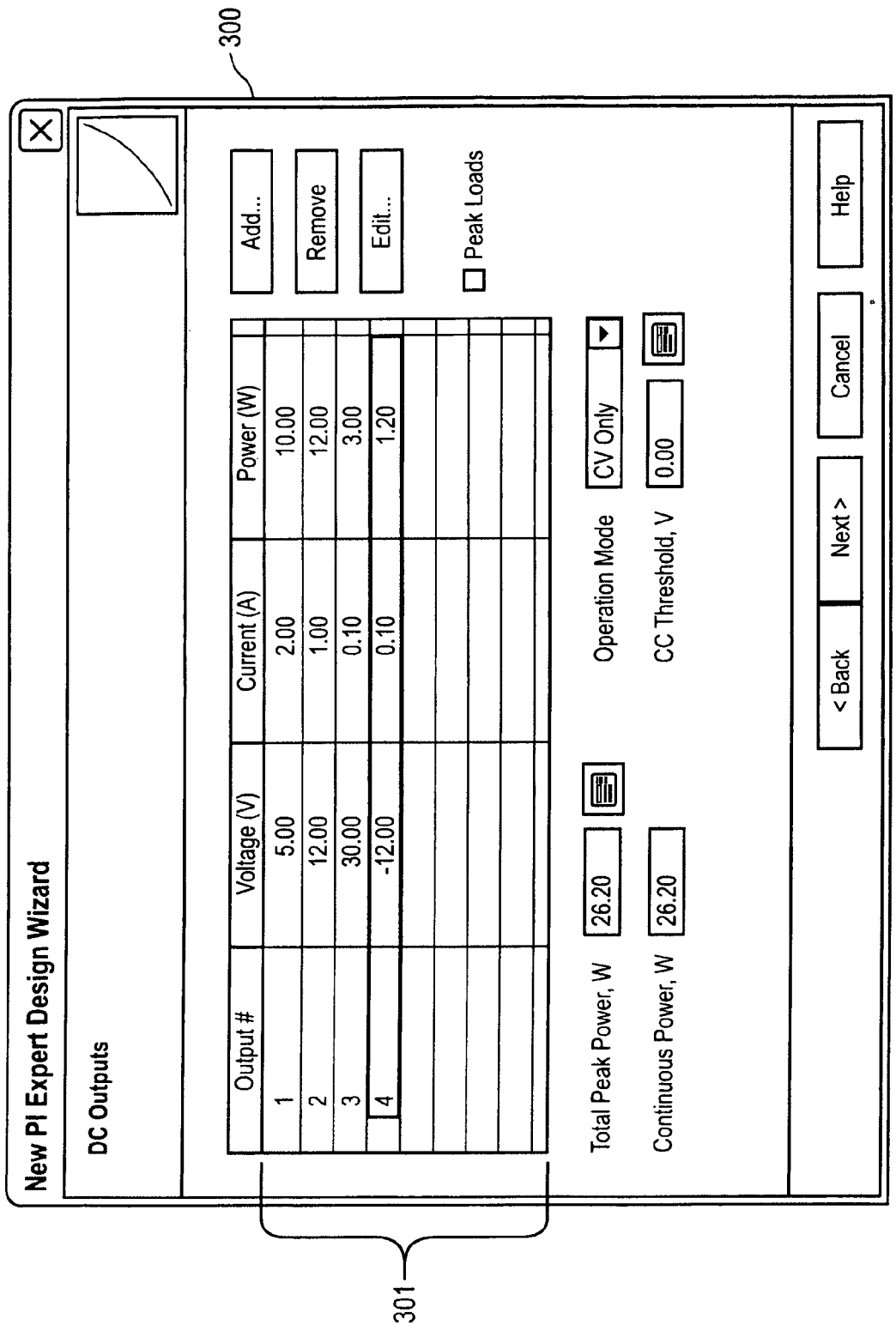
FIG. 3 is a diagram illustrating an example user interface for inputting power supply specifications, in accordance with the teachings of the present invention.

FIG. 3 is a diagram illustrating an example user interface 300 for inputting desired output power supply specifications 301, in accordance with the teachings of the present invention. In general, user interface 300 allows a user to specify a number of outputs to be included in the power supply design as well as the voltage, current, and power requirements for each output. For example, four outputs (i.e., Output #1-4) are shown as being inputted in example user interface 300. Output #1 is specified in the example as having an output voltage of 5.00V, a current output of 2.00 A, and a power output of 10.00 W. Although FIG. 3 illustrates the inputting of a power supply design with four outputs, any number of outputs may be specified by a user including one or more outputs. In one example, user interface 300 also includes an option for a user to input the peak load conditions, if applicable, at each of the specified outputs.

Figure 4:
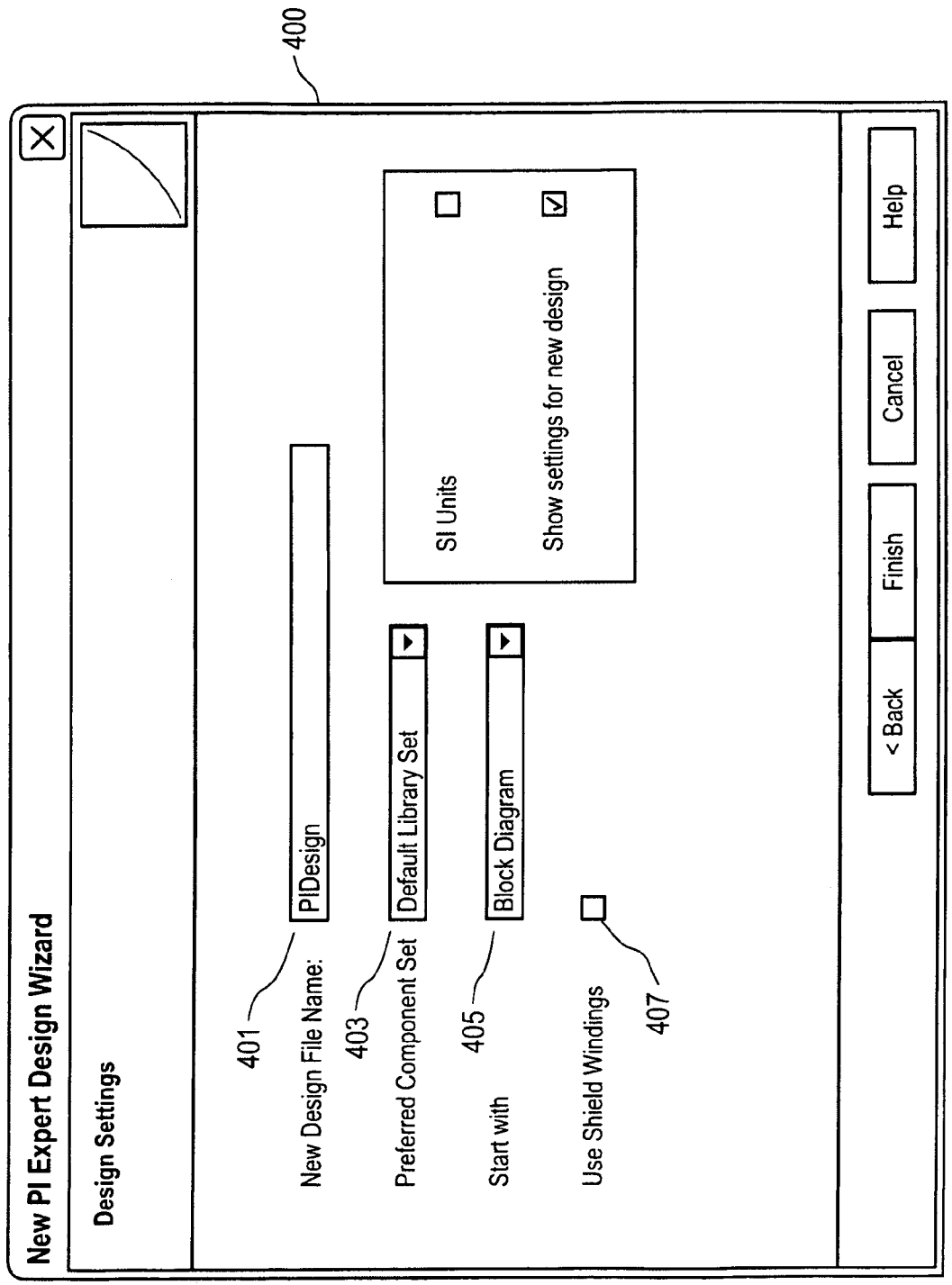
FIG. 4 is a diagram illustrating an example user interface for inputting design settings, in accordance with the teachings of the present invention.

FIG. 4 is a diagram illustrating an example user interface 400 for inputting design settings, in accordance with the teachings of the present invention. The illustrated example of user interface 400 includes a filename input region 401, a component set input region 403, an initial result view input region 405, and a shield winding selection input region 407.

Filename input region 401 allows the user to input a filename by which the power supply design results may be saved under. Component set input region 403 allows a user to select a particular set of components that the software may draw from when selecting components for its power supply designs. In one example, a component set is a database of components with their respective parameters. For example, a component set may contain multiple types of output diodes (e.g., Schottky, Ultra-Fast Recovery, Fast Recovery, Standard Recovery, etc.). Within each diode type, the component set may include diodes with various voltage and current ratings. The component set may also include multiple types of transformer cores and core sizes that may be used in the power supply design (e.g., EE13, EE25, E125, E1128, EF12.6, EF30, PQ26/20, PQ20/16, RM5, RM10, ETD29/16/10, ETD34/17/11, EPC13, EPC19, etc.).

Still referring to FIG. 4, a user may pre-select the initial view by which the power supply design results will be displayed with initial result view input region 405. As will be discussed below, a user may select from a block diagram view, a design results view, and a transformer construction view. A user may also designate whether the transformer to be used in the power supply design should include shield windings by selecting or deselecting shield winding selection input region 407.

Figure 5:
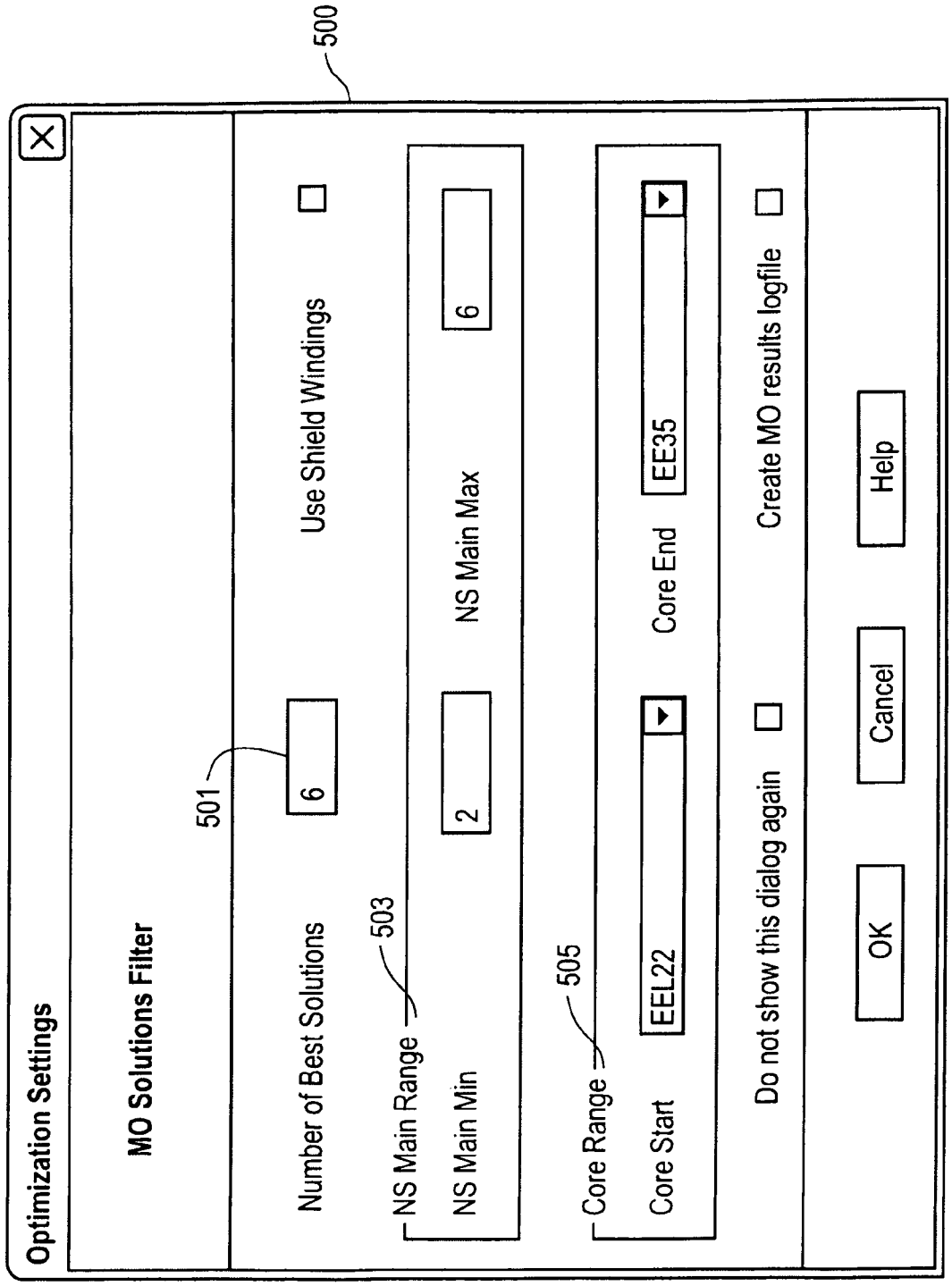
FIG. 5 is a diagram illustrating an example user interface for inputting design settings, in accordance with the teachings of the present invention.

FIG. 5 is a diagram illustrating an example user interface 500 for inputting design settings, in accordance with the teachings of the present invention. The illustrated example of user interface 500 includes maximum designs input region 501, NS main range input region 503, and core range input region 505. Maximum designs input region 501 allows a user the ability to input the maximum number of designs to include in the power supply design results. As will be described in further detail below, this maximum number of designs not only controls the number of power supply designs displayed to the user, but also controls the maximum number of designs maintained during the calculation, optimizing and selection of power supply designs.

Also included in user interface 500 is NS main range input region 503, which is configured to allow a user to specify a minimum and maximum number of secondary turns which the user may determine based on design limitations of the transformer such as bobbin dimensions, wire gauge, etc. Similarly, core range input region 505 is configured to allow a user to specify a minimum and maximum core size for a transformer that is to be included in the power supply design.

Figure 6:
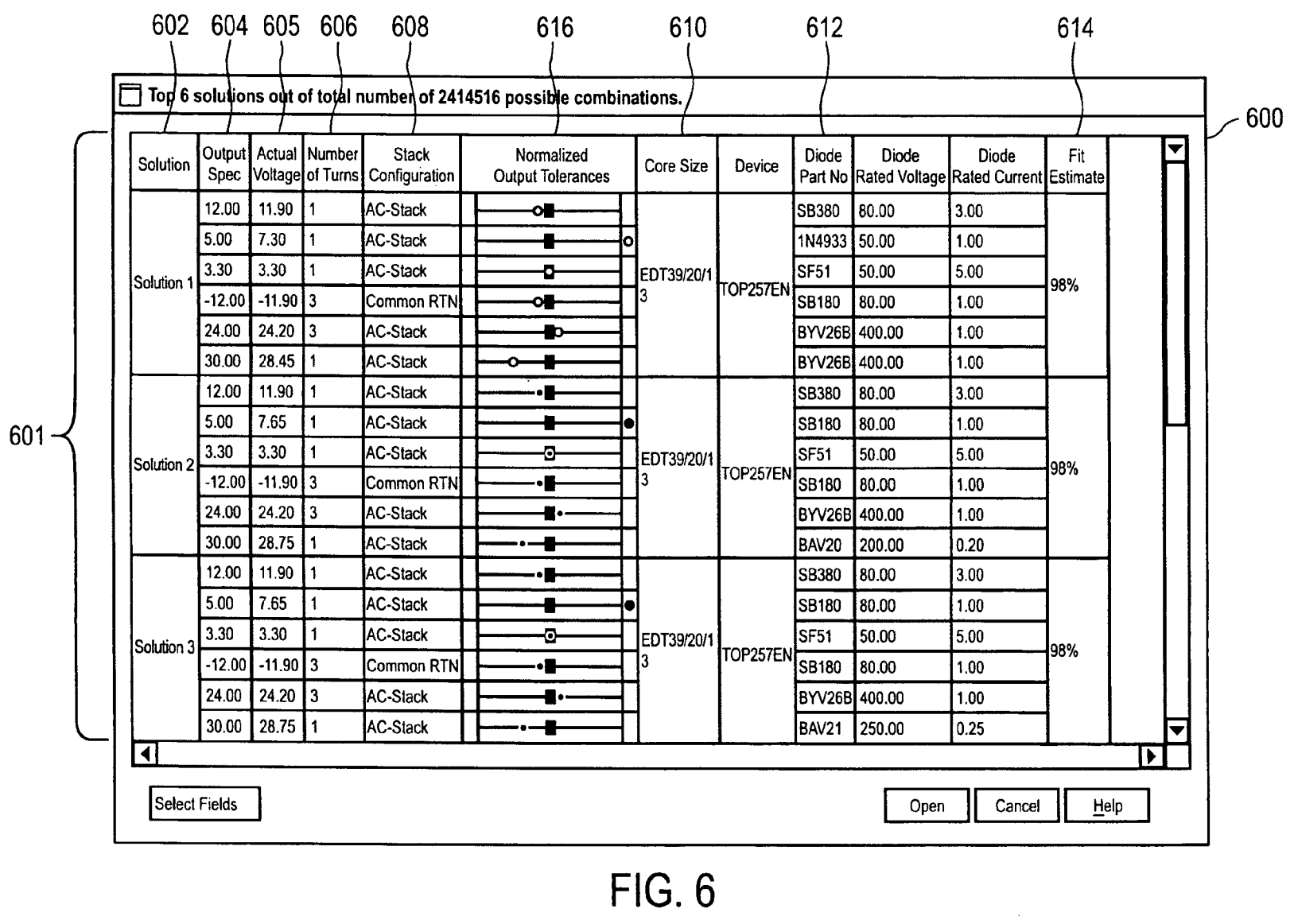

FIG. 6 is a diagram illustrating an example user interface 600 for displaying an output list 601 of power supply designs, in accordance with the teachings of the present invention. As shown in FIG. 6, example user interface 600 displays an output list 601 of power supply designs. In one example, user interface 600 may display a number of solutions in order from the highest score to the lowest score based on a scoring system used to evaluate each design. In another example, output list 601 includes a maximum number of power supply designs as were inputted into maximum designs input region 501 of user interface 500. As shown, a first column 602 displays the number of solutions. For each power supply design included in output list 601, a column 604 displays the user specified output voltages while column 605 displays the actual output voltage for each corresponding output of the power supply. User interface 600 may also include a column 606 that displays a number of turns of secondary windings in the transformer of the power supply design, a column 608 that displays the stacking configuration for each output of the transformer, a column 610 identifying the core type and size of the transformer, and a column 612 that displays the output diode corresponding with each output of the power supply. Also, included in user interface 600 is a column 614 that displays a fit estimate which is a percentage of filled area of the bobbin. In one example, if the fit estimate is 95% the bobbin may still accommodate layers of windings before it reaches full capacity at 100%. In yet another example, a column 616 displays a normalized output tolerance. More specifically, column 616 gives a visual depiction of how close the actual voltage on each output of the power supply is in relation to the desired corresponding output.

Figure 7:
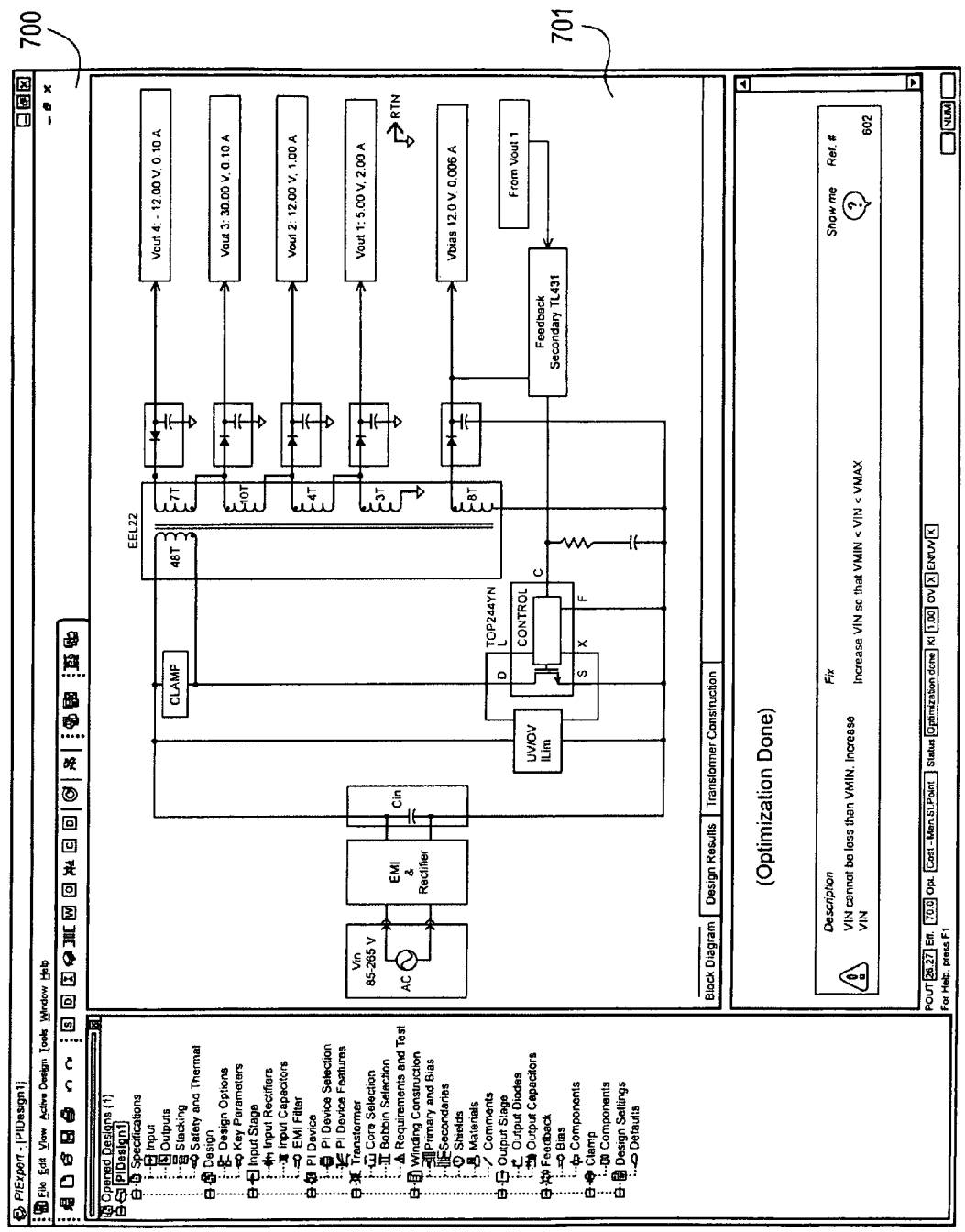
FIG. 7 is a diagram illustrating an example user interface for displaying a block diagram of a power supply design, in accordance with the teachings of the present invention.

FIG. 7 is a diagram illustrating an example user interface 700 for displaying a schematic 701 of a power supply design, in accordance with the teachings of the present invention. User interface 700 represents one possible implementation of a user interface that may be displayed to a user when one or more of the power supply designs listed in output list 601 is selected. As shown in FIG. 7, block diagram 701 is a circuit diagram of one of the resultant power supply designs and may include information regarding core size, actual turns of the primary and secondary windings, stacking configurations, controller type and their respective circuit connections.

Figure 8:
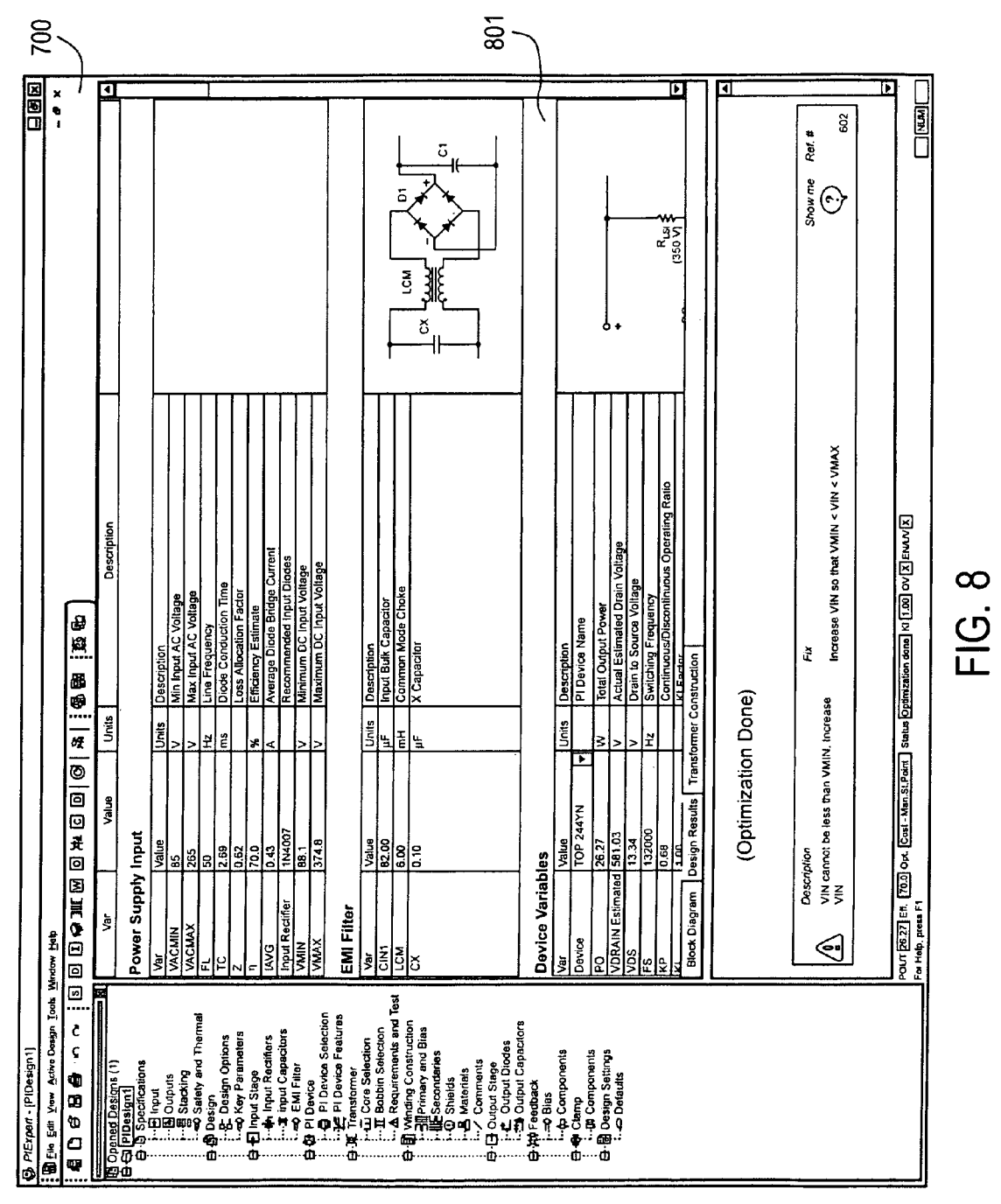

FIG. 8 is a diagram illustrating example user interface 700 for displaying design results 801 of a power supply design, in accordance with the teachings of the present invention.

Figure 9:
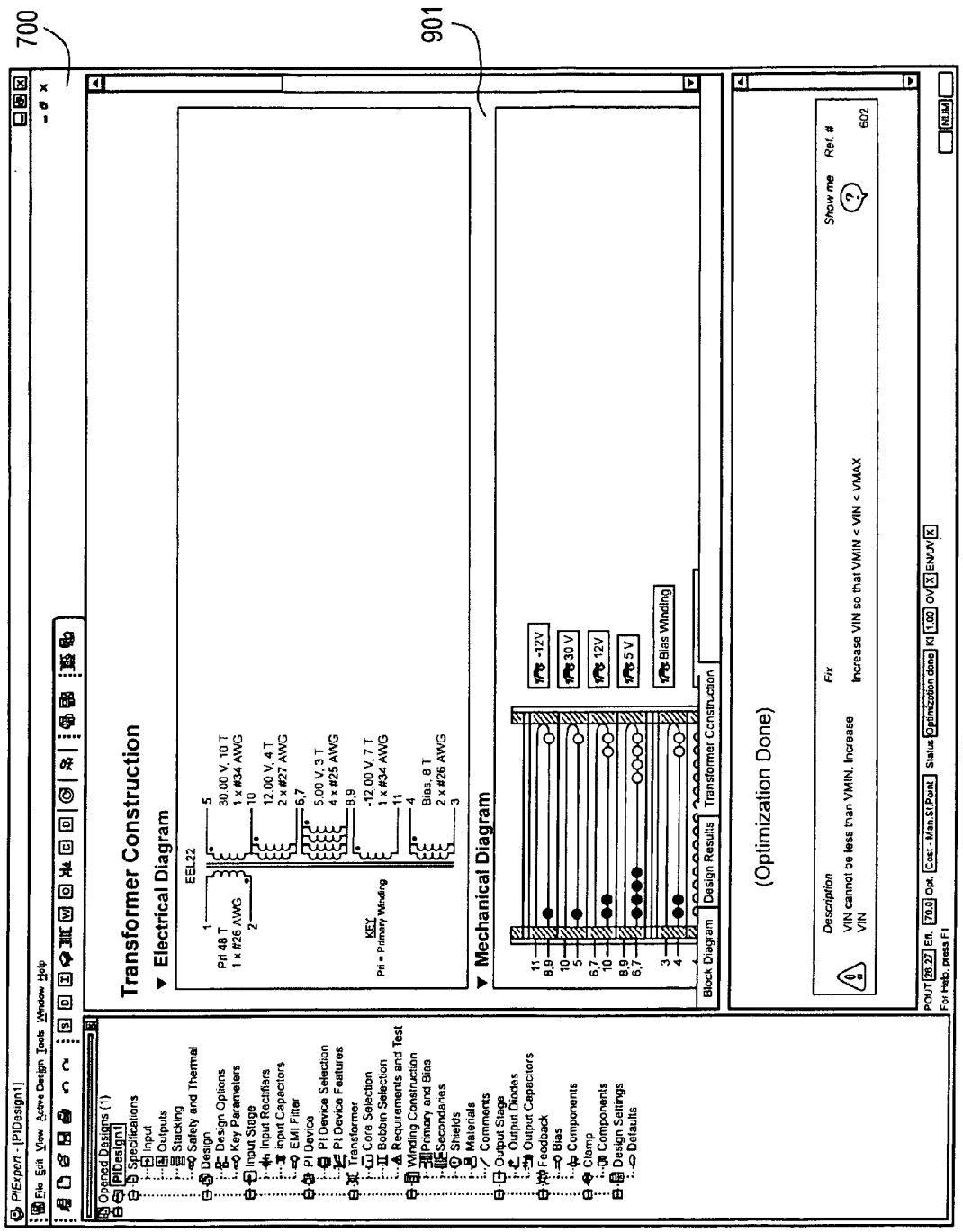
FIG. 9 is a diagram illustrating an example user interface for displaying the transformer construction of a transformer included in a power supply design, in accordance with the teachings of the present invention.

FIG. 9 is a diagram illustrating example user interface 700 for displaying the transformer construction 901 of a transformer included in a power supply design, in accordance with the teachings of the present invention.

FIG. 10 is a diagram illustrating an example user interface 1000 for displaying a stacking arrangement of the outputs of a power supply design, in accordance with the teachings of the present invention. In one example, three stacking arrangement options are available and include: a DC stacking arrangement, an AC stacking arrangement, and a floating stacking arrangement. Each stacking arrangement option has advantages and disadvantages depending on the design specifications of the power supply. More specifically, an AC stacking arrangement (e.g., outputs no. 1, 2, and 3 of FIG. 10) allows for the secondary side to use a single coil of wire to be shared between one or more outputs. A DC stacking arrangement (e.g., output no. 4 of FIG. 10) allows the adjustment of the voltage ratio by a diode drop in order to get closer to a specified output voltage since the number of turns around a bobbin with a coil wire may only be adjusted in integral numbers. A floating arrangement (not shown) uses individual coils for each output of the power supply. In one example, each output will be designated a particular stacking arrangement in the power supply design optimization process based on user input priorities.

Figure 11:
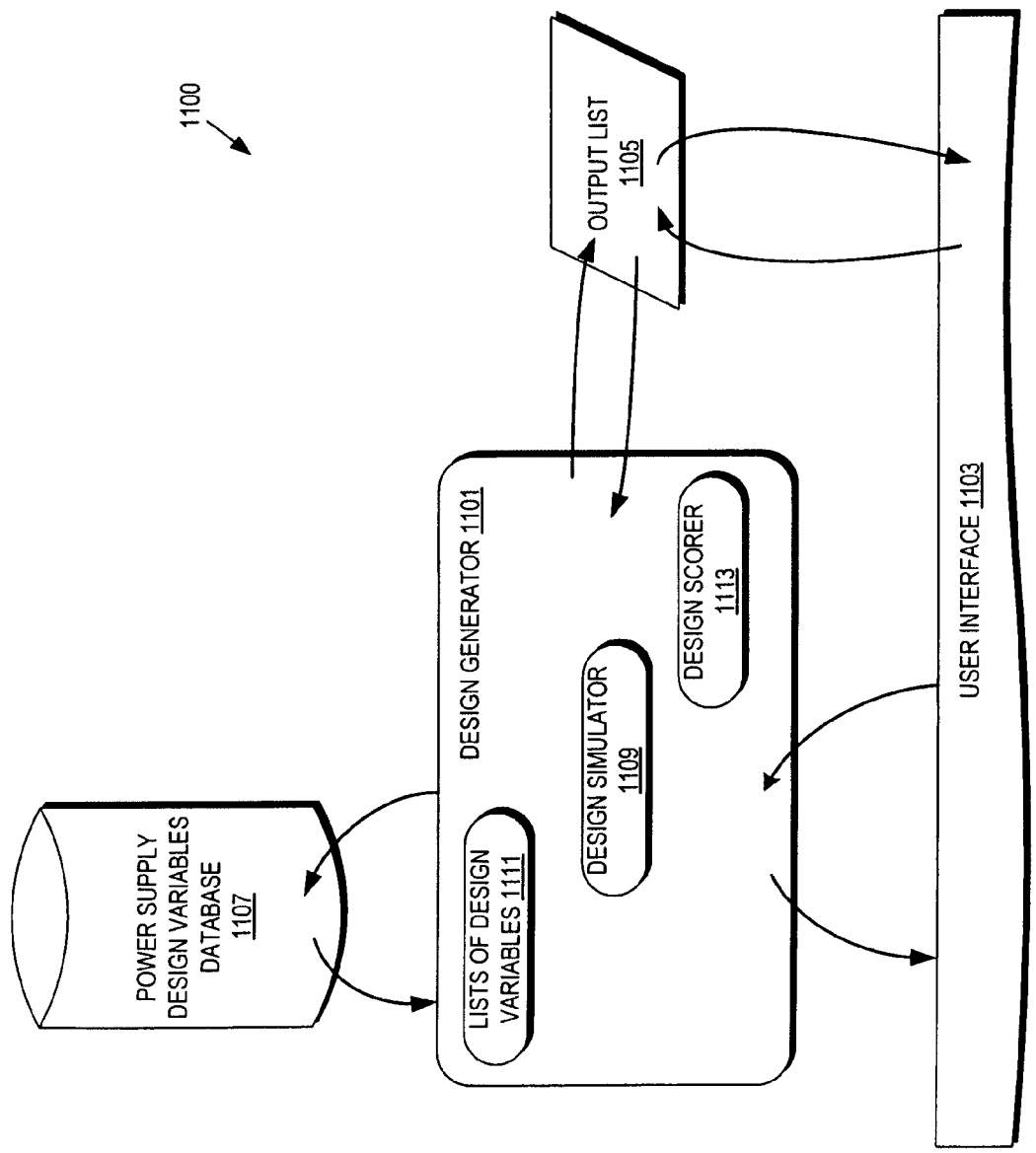
FIG. 11 is a functional block diagram illustrating an example computer system, in accordance with the teachings of the present invention.

FIG. 11 is a functional block diagram illustrating an example computer system 1100, in accordance with the teachings of the present invention. The illustrated example of computer system 1100 includes a design generator component 1101, a user interface component 1103, an output list component 1105 and a database component 1107. Design generator component 1101 is illustrated as including a design simulator component 1109, a list component 1111, and a design scorer component 1113. In one example, user interface component 1103 is one or more of the user interfaces 100, 200, 300, 400, 500, 600, 700, 800, 900, and 1000, as described above.

Database component 1107 provides design generator component 1101 with various sets of variables for use in power supply designs. For example, the variables included in database component 1107 may include multiple types of output diodes (e.g., Schottky, Ultra-Fast Recovery, Fast Recovery, Standard Recovery, etc.) and various voltage and current ratings of each type. Database component 1107 may also include multiple types of transformer cores and core sizes that may be used in the power supply designs.

In one example, design generator 1101 extracts only viable options from database component 1107 based, in part, on the user input design parameters. The viable options selected from database component 1107 may then be used to form the lists of design variables of list component 1111. In one example, design generator 1101 determines viability of a component based on predetermined rules, where there may be differing rules for different types of variables. For example, a range of current ratings based on the power supply design parameters for diodes may be the criteria for determining viable diodes from database component 1107. In another example, a number of secondary turns may be limited by the number of turns that can be supported by the height and/or width of the bobbin and/or a reasonable limit based on specific power supply design criteria.

Figure 12:
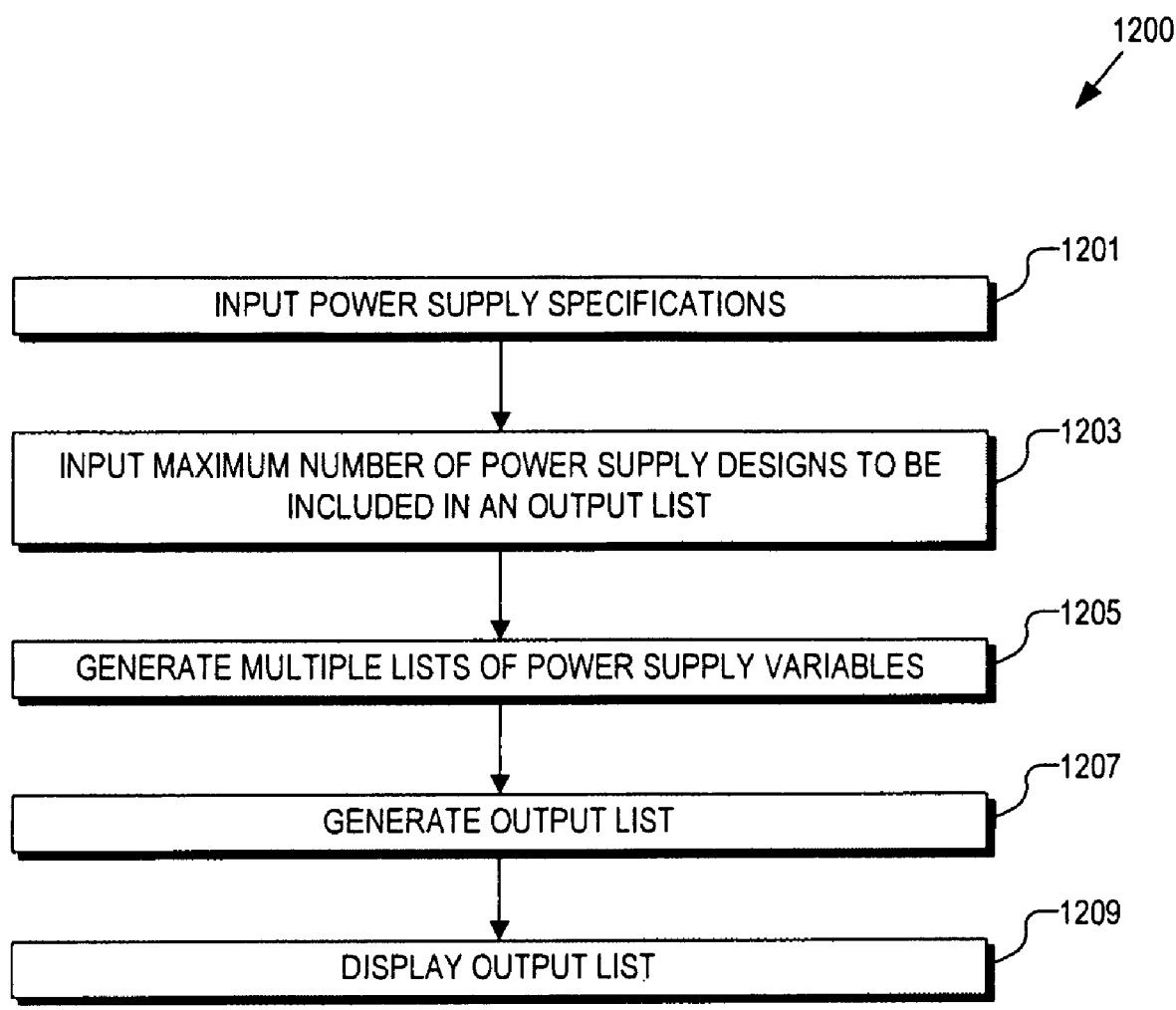
FIG. 12 is a flowchart diagram illustrating an example process for the design of a power supply, in accordance with the teachings of the present invention.
Figure 13:
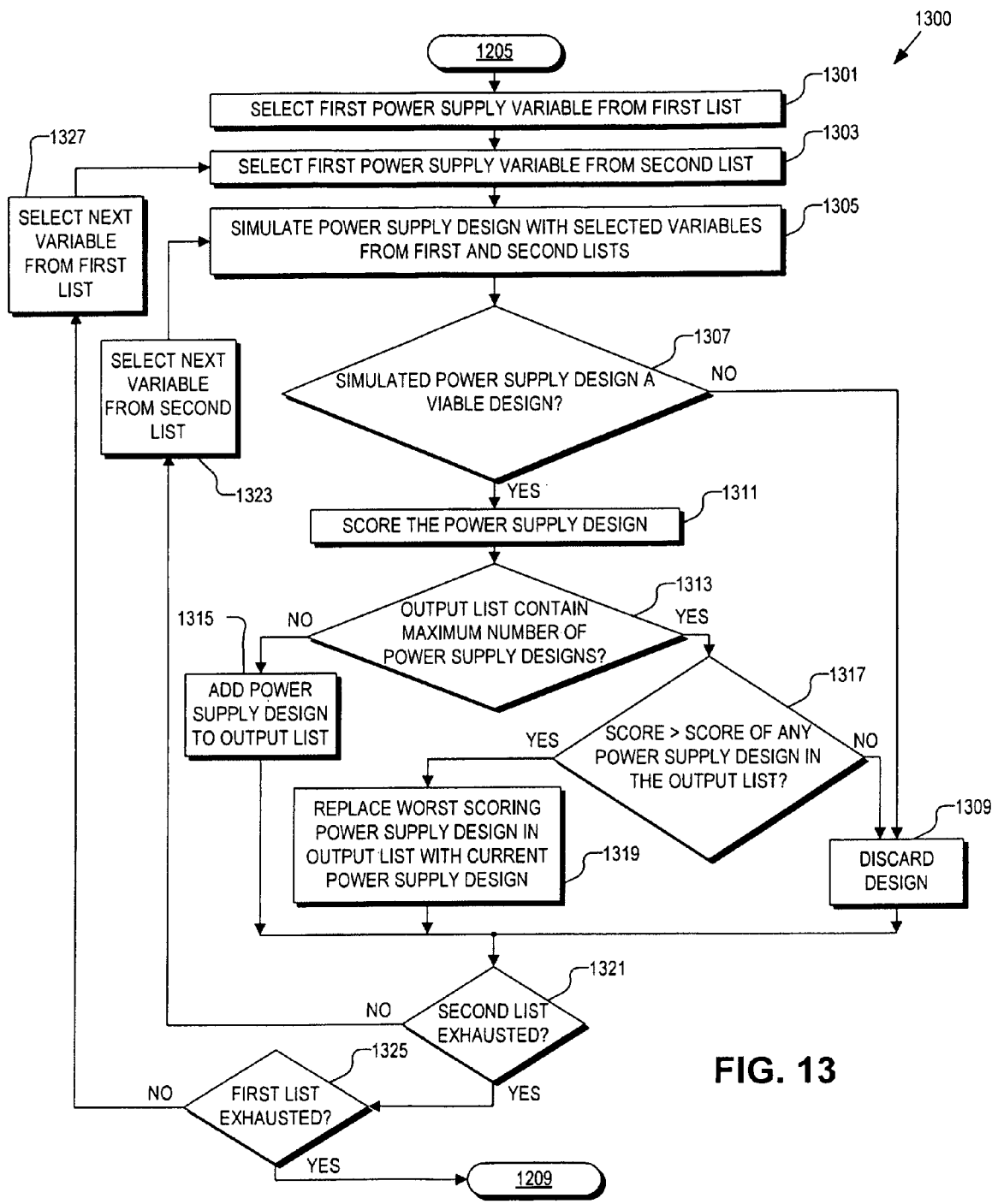
FIG. 13 is a flowchart diagram illustrating an example process for generating an output list of power supply designs having a single output with multiple variables, in accordance with the teachings of the present invention.

FIG. 12 is a flowchart diagram illustrating an example process 1200 for the design of a power supply, in accordance with the teachings of the present invention. FIG. 13 is a flowchart diagram illustrating an example process 1300 for generating an output list of power supply designs, in accordance with the teachings of the present invention. The operation of computer system 1100 is described with reference to FIGS. 11, 12, and 13.

In a process block 1201 user interface 1103 receives power supply specifications from a user's input. In one example, a "user" is a person operating a computer, such as a personal computer. In one example, a "user" is another software entity controlling or providing input to computer system 1100. Power supply specifications that are input by user interface 1103 may include the circuit topology, the type of power controller, input voltages of the power supply, a number of outputs of the power supply, and an output voltage and an output current as discusses above with reference to FIGS. 1, 2, and 3. In a process block 1203, user interface 1103 inputs the maximum number of power supply designs to be included in an output list.

Next, in a process block 1205 list component 1111 generates multiple lists of power supply variables suitable for use by the desired power supply design. In one example, list component 1111 generates the multiple lists of power supply variables in response to the input specifications input by a user in process block 1201. For example, list component 1111 may query database component 1107 and generate a list of viable output diodes for each output of the desired power supply design. In one example, the lists of output diodes further includes a diode current rating for each diode included in the list. List component 1111 may further generate a list of core types of the transformer to be used in the power supply design, a list of stacking arrangements, a list of possible number of turns for the secondary side of the transformer, and a list of core sizes of the transformer.

Next in a process block 1207, design generator 1101 generates output list 1105 which contains no more than the maximum number of scored power supply designs. Lastly, in a process block 1209 user interface 1103 displays the output list to a user. In one example, user interface 1103 displays the output list to a user by way of a computer monitor. However, user interface 1103 may display output list by other means, such as by printing, storing to memory (external or internal), or transmitting via a network or other communications link.

Process block 1205 is now described in more detail with reference to FIG. 13 which illustrates an example process 1300 for generating an output list 1105 of power supply designs. For ease of explanation, process 1300 is described with reference to only two lists (i.e., a first list and a second list) of power supply variables. However, as shown above, any number of lists of power supply variables, including one or more, may be implemented in accordance with the teachings of the present invention. In a process block 1301 design simulator 1109 selects a first power supply variable from the first list of power supply variables maintained in list component 1111. In a process block 1303 design simulator 1109 selects a first power supply variable from the second list of power supply variables maintained in list component 1111. By way of example, the first list may contain a list of suitable output diodes, while the second list may contain a list of core types. In this example, design simulator 1109 selects a diode from the list of diodes and a core type from the list of core types.

In a process block 1305, design simulator 1109 simulates a power supply design with the selected variables from the first and second lists (e.g., the diode from the diode list and the core type from the list of core types). After the power supply design is simulated, design simulator 1109 determines whether the simulated power supply design is a viable design in decision block 1307. In one example, power supply viability may be verified by determining whether various power supply parameters are satisfied such as, maximum flux density, peak flux density, gap size, transformer fit, and/or peak current. If the power supply design is determined not to be a viable design then the current design is discarded in process block 1309. However, if the power supply design is indeed determined to be viable, then the process continues to process block 1311, where design scorer component 1113 calculates a score for the current power supply design. In one example, the score is a numerical value assigned to a power supply design that represents how well the power supply design complies with the user input power supply specifications. In another example, the score may weight the input power supply specification according to the user's preferences. More specifically, a user interface may provide the user with the option to selectively prioritize certain input parameters for increased efficiency and/or cost efficiency. In one example, a better score is represented by a greater numerical value.

By way of example, design scorer component 1113 may calculate the score for a power supply design in response to multiple weighted factors. Design scorer component 1113 may weigh these factors evenly or may be configured to weigh certain factors heavier than others. Equation 1, below, represents one possible implementation for calculating a score of a power supply design using weighted factors.

$$\text{Score}=\text{InSpec}*W_1+\text{Core}*W_2+\text{Stack}*W_3+\text{Accuracy}*W_4+\text{SD\_IF}*W_5+\text{SD\_VR}*W_6+\text{SD\_Type}*W_7 \quad \text{EQ1}$$

, where InSpec is representative of a ratio of the number of outputs of the power supply design that are within specification (within a specified tolerance) to a number of outputs of the power supply design that are not within specification as determined by the input power supply specifications; Core is representative of a cost and size of the core type of the transformer; Stack is representative of a normalized cost of the type of stacking arrangement of the transformer; Accuracy is representative of how closely the actual output voltages of the windings match the specified output voltage of each winding; SD_IF is representative of the normalized cost of an output diode having a forward current rating at or above the simulated current through the output diode; SD_VR is representative of the normalized cost of an output diode having a reverse voltage rating at or above the simulated reverse voltage of the output diode; and SD_Type is representative of the normalized cost of the type of diode type selected. Weights $W_1$-$W_7$ are representative of individual weights assigned to the various factors. In one example, $W_1$ is equal to $10^9$, $W_2$ is equal to $10^8$, $W_3$ is equal to $10^6$, $W_4$ is equal to $10^5$, $W_5$ is equal to $10^4$, $W_6$ is equal to $10^3$, and $W_7$ is equal to $10^2$. Thus, in this example, the InSpec factor is weighted more heavily than any of the other factors. In one example, the weighting scheme may allow for prioritization of the factors.

Referring now back to FIGS. 11 and 13, design generator component 1101 then determines whether output list component 1105 contains the maximum number of power supply designs in decision block 1313. If not, design generator component 1101 proceeds to process block 1315 and adds the current power supply design to the output list maintained by output list component 1105. If the output list already contains the maximum number of power supply designs then design generator component 1101 proceeds to decision block 1317 where the score of current power supply design is compared with the scores of power supply designs already stored in output list component 1105. In a process block 1319, if the score of the current power supply design is greater than the score of any power supply design stored in the output list then process 1300 proceeds to process block 1319, where the worst scoring power supply design in the output list is replaced with the current power supply design. If the current power supply design is not greater than the score of any power supply design in the output list then process 1300 proceeds to process block 1309 where the current power supply design is discarded. Thus, in example process 1300, the output list is initially populated with power supply designs regardless of their relative scores and once the maximum number of power supply designs are stored in the output list, process 1300 then begins the procedure of comparing scores and replacing low scoring power supply designs in the output list with higher scoring designs during processing through the various combinations of possible designs.

Continuing now to decision block 1321, design generator 1101 now determines whether the second list of power supply design variables has been exhausted. In other words, a determination is made as to whether the end of the second list has been reached. If not, the process proceeds to process block 1323 where the next variable from the second list is selected and the process returns to process block 1305. However, the first variable from the first list of variables is still selected. Thus, on the second time through process block 1305 a power supply design having the first variable from the first list and a second variable from the second list is used for the simulation. In one example, process 1300 repeats blocks 1307 through 1319 for each variable in the second list, simulating each with the first variable selected from the first list.

When, in decision block 1321 a determination is made that the second list is exhausted, the process proceeds to decision block 1325 where it is now determined whether the first list is exhausted. If not, the process continues to process block 1327 where a next variable is selected from the first list of power supply variables. However, process 1300 now repeats to process block 1303 where the first variable from the second list is again selected. Stated another way, the second list of power supply design variables is reset, such that process 1300 repeats blocks 1305 through 1319 for each variable in the second list, simulating each now with the second variable selected from the first list. It is in an example such as this that all possible combinations of variables selected from the lists are considered for design viability and then scored according to the scoring system mentioned above. Once all lists of design variables are exhausted, process 1300 proceeds to process block 1209 where the resultant output list is displayed.

Figure 14:
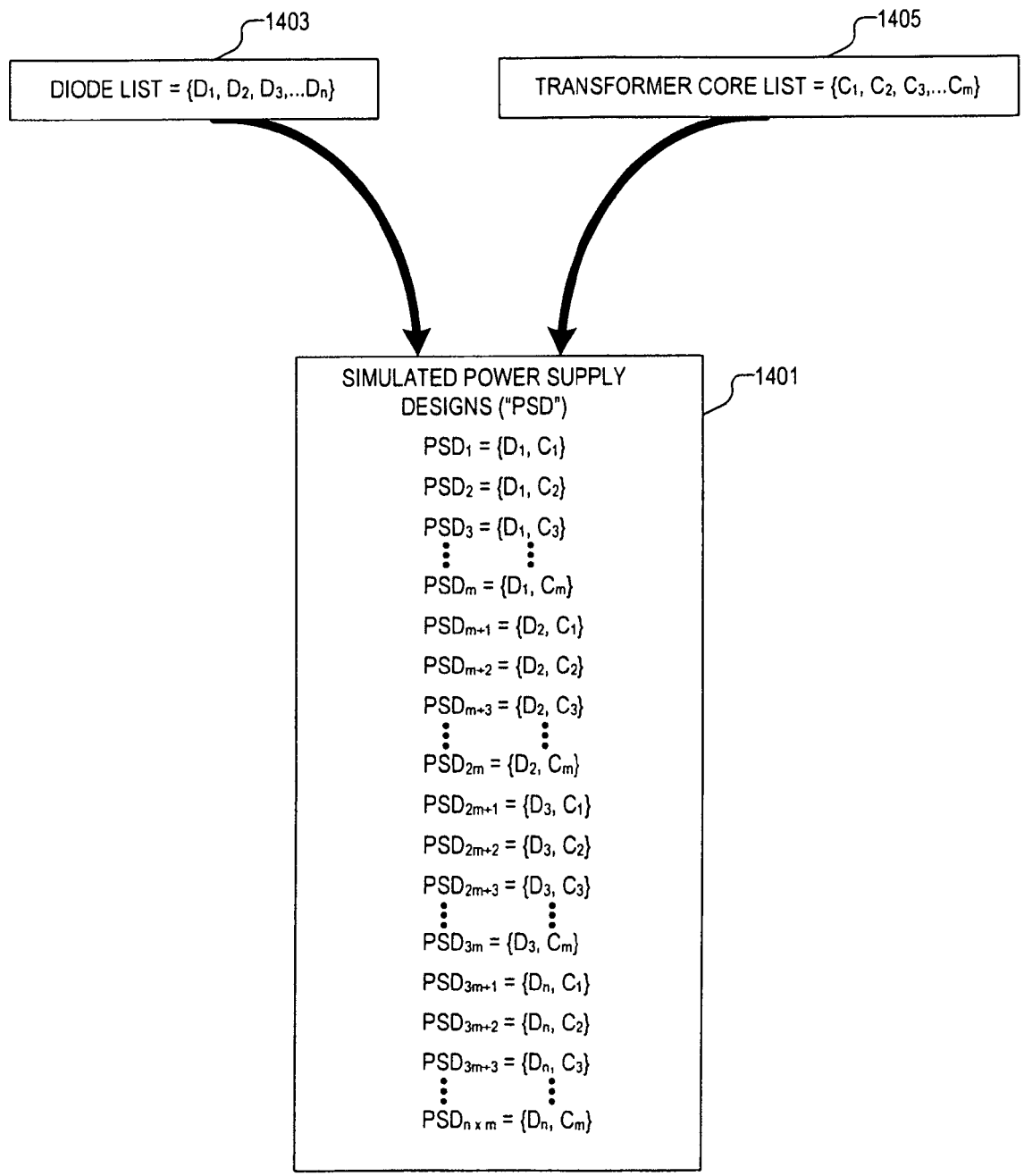
FIG. 14 is a diagram illustrating example simulated power supply designs and their respective combinations of power supply design variables, in accordance with the teachings of the present invention.

FIG. 14 is a diagram illustrating example simulated power supply designs 1401 and their respective combinations of power supply design variables, in accordance with the teachings of the present invention. In one example the first list of power supply variables described in process 1300 is a list of diodes 1403 and the second list of power supply variables is a list of transformer cores 1405. As process 1300 repeats blocks 1305 through 1319, multiple power supply designs are simulated which includes multiple combinations of power supply design variables selected from the first and second lists. In the example shown in FIG. 14 a first power supply design $PSD_1$ is simulated with the first diode $D_1$ selected from diode list 1403 and the first transformer core $C_1$ selected from transformer core list 1405. A second power supply design $PSD_2$ is simulated with the first diode $D_1$ and a second transformer core $C_2$ selected from transformer core list 1405. As mentioned above, process 1300 will repeat until the transformer core list 1405 is exhausted, at which point the second diode $D_2$ is selected from diode list 1403 and power supply designs are simulated with every combination of diode $D_2$ with transformer cores $C_1$-$C_m$. Thus, the illustrated example of power supply designs 1401 will include every possible combination of a power supply design variable selected from each of the first and second lists. By way of reminder, although FIG. 14 illustrates simulated power supply designs using only two lists of variables, as mentioned above, any number of lists of variables may be implemented, including one or more lists. As can be seen from FIG. 14, as the number of lists increases and as the number of variables within each list increases, the number of simulated power supply designs increases exponentially. For example, a list of diodes may include up to 50 diodes, a list of core types may include up to 10 core types, a list of possible number of turns may include up to 15 options, and a list of transformer stacking arrangements may include up to 3 stacking arrangements (AC stacking, DC stacking, and floating). Thus, the total number of combinations of design variables can be very large (i.e., on the order of millions). Furthermore, each output of the power supply design may include its own lists of power supply design variables, further multiplying the number of combinations by the number of outputs to be included.

Figure 15:
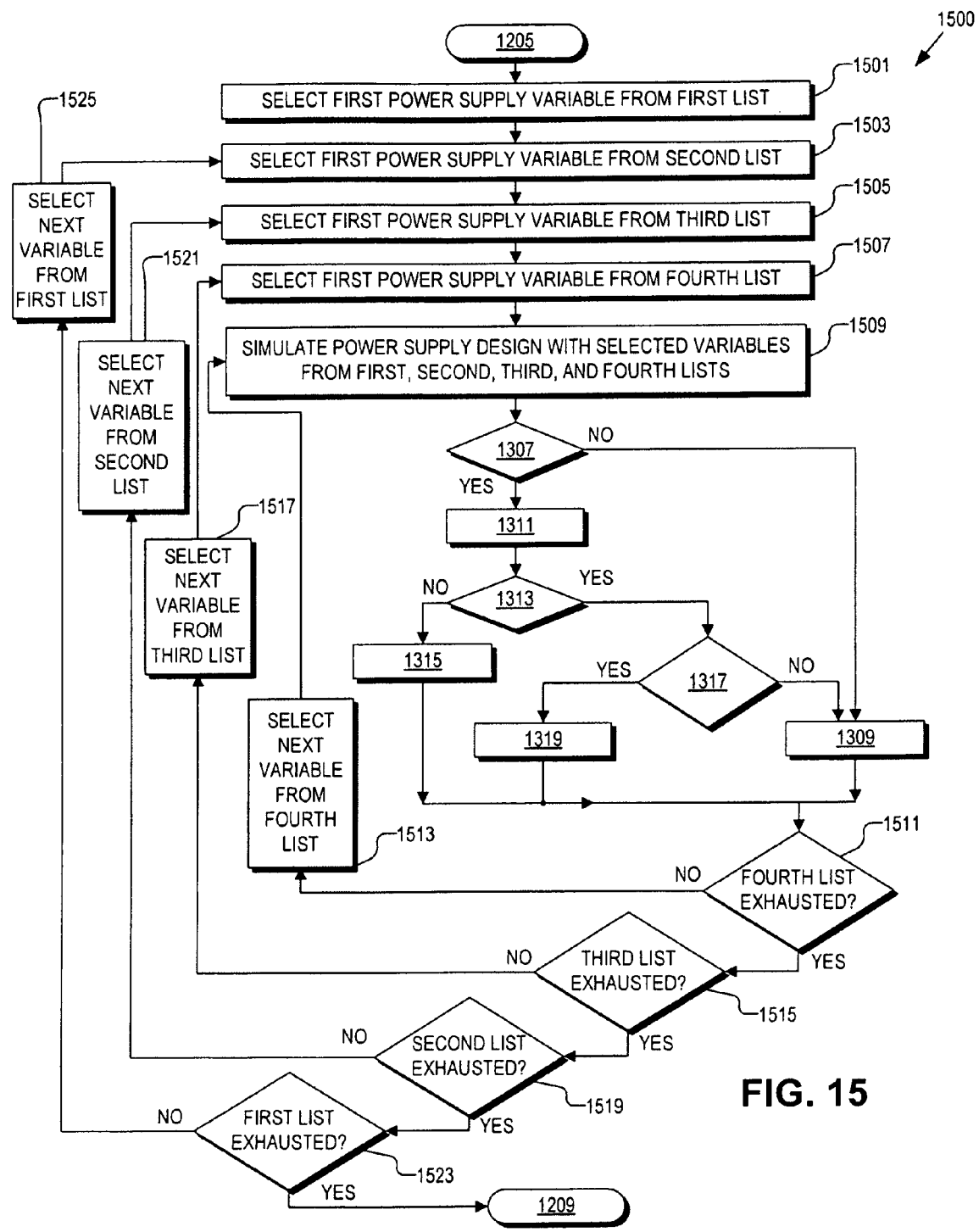
FIG. 15 is a flowchart diagram illustrating an example process for the design of a power supply having multiple outputs each with multiple variables, in accordance with the teachings of the present invention.

FIG. 15 is a flowchart diagram illustrating an example process 1500 for the design of a power supply having multiple outputs each having multiple lists of design variables, in accordance with the teachings of the present invention. In one example a first and second lists of power supply design variables corresponding to a first output of the power supply design are generated. In this example, third and fourth lists of power supply design variables corresponding to a second output of the power supply design are generated. By way of example, the first and third lists may be lists of diodes, suitable for use on their respective outputs of the power supply design. The second and fourth lists may be lists of numbers of turns of each transformer output.

In process blocks 1501 through 1507, a first power supply design variable is selected from each of the four lists. In process block 1509 a power supply design is simulated using the selected variables. Blocks 1307 through 1319 are the same as discussed with reference to process 1300, above. Blocks 1511 though 1525 provide control for process 1500 to ensure that each combination of power supply design variables from the first, second, third, and fourth lists are simulated in a power supply design. Thus, every possible combination of power supply variables corresponding to the first output combined with every possible combination of power supply variables corresponding to the second output is simulated.

The order in which some or all of the process blocks appear in each aforementioned processes should not be deemed limiting. Rather, one of ordinary skill in the art having the benefit of the present disclosure will understand that some of the process blocks may be executed in a variety of orders not illustrated.

Figure 16:
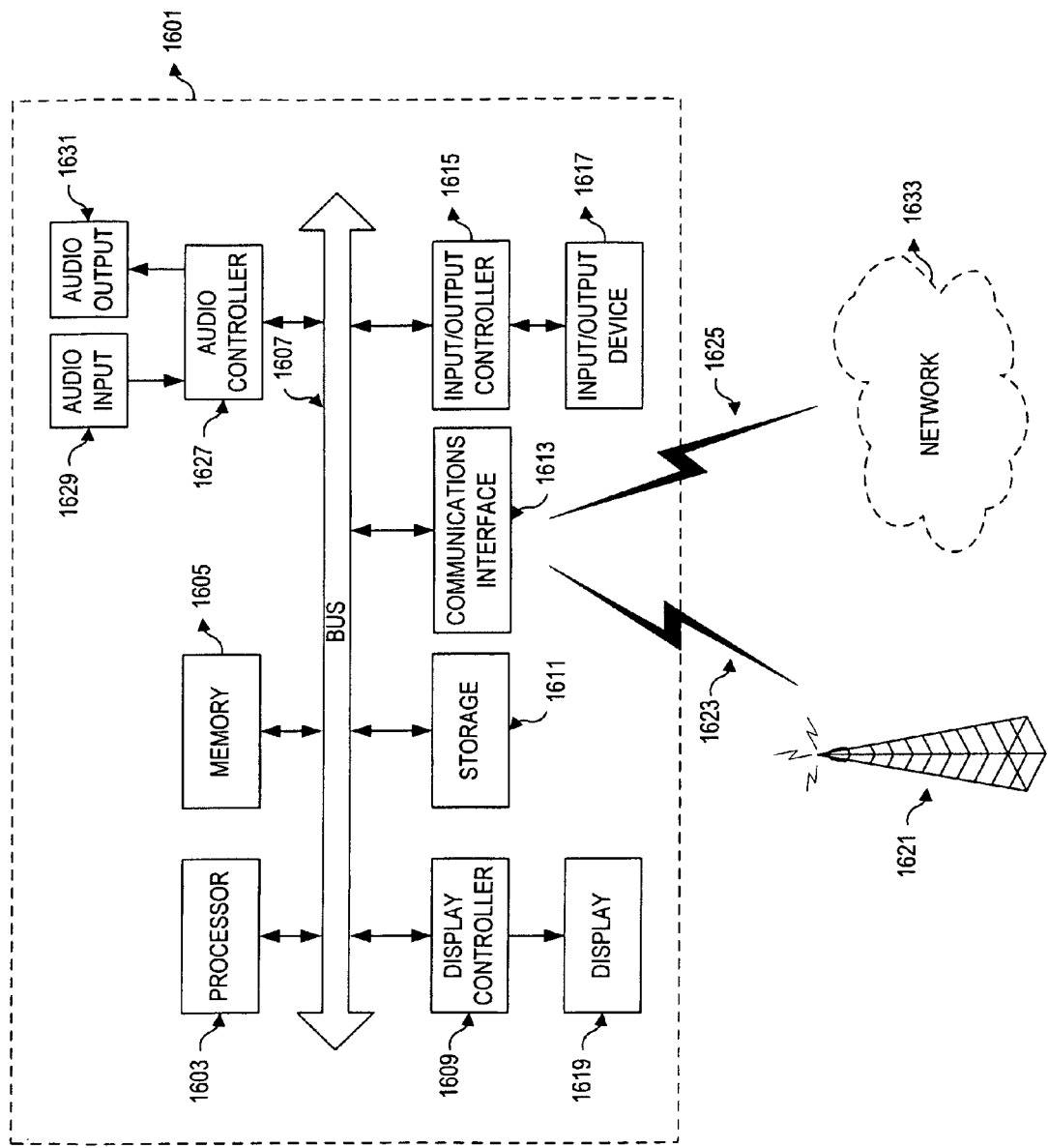
FIG. 16 is a functional block diagram illustrating an example computer system, in accordance with the teachings of the present invention.

FIG. 16 is a functional block diagram illustrating an example computer system 1601, in accordance with the teachings of the present invention. Computer system 1601 may be a personal computer, a personal digital assistant, or any other suitable computing equivalent capable to run software such as software including instructions to perform the processes described herein, in accordance with the teachings of the present invention. In one embodiment, computer system 1601 is a computer that includes a processor 1603 coupled to a bus 1607. In one embodiment, memory 1605, storage 1611, display controller 1609, communications interface 1613, input/output controller 1615 and audio controller 1627 are also coupled to bus 1607.

In one embodiment, computer system 1601 interfaces to external systems through communications interface 1613. Communications interface 1613 may include an analog modem, digital modem, a network interface card, a wireless network interface, an optical carrier interface, token ring interface, satellite transmission interface, or any other interfaces for coupling a device to other devices.

In one embodiment, a carrier wave signal 1623 is received/ transmitted by communications interface 1613 to communicate with a wireless antenna 1621. In one embodiment, wireless antenna 1621 provides a wireless interface to a network 1633. In one embodiment, carrier wave signal 1625 is received/transmitted by communications interface 1613 to communicate with network 1633. In one embodiment, communications signals 1623 and/or 1625 may be used to interface computer system 1601 with another computer system, a network hub, router or the like. In one embodiment, communications signals 1623 and 1625 may be transmitted through wires, cables, optical fibers or through the atmosphere, or the like.

In one embodiment, processor 1603 may be a conventional microprocessor, such as one typically found in personal home computers. Memory 1605 may be a computer-readable medium such as dynamic random access memory (DRAM) and may include static random access memory (SRAM). Display controller 1609 controls in a conventional manner a display 1619, which in one embodiment may be a cathode ray tube (CRT), a liquid crystal display (LCD), an active matrix display, a plasma display, a projector display, a television monitor or the like. The input/output device 1617 coupled to input/output controller 1615 may be a keyboard, disk drive, printer, scanner and other input and output devices, including a television remote, mouse, trackball, track pad, joystick, pointing device or the like. In one embodiment, audio controller 1627 controls in a conventional manner audio output 1631, which may include for example audio speakers, headphones, an audio receiver, amplifier or the like. In one embodiment, controller 1627 also controls in a conventional manner audio input 1629, which may include for example a microphone or input(s) from an audio or musical device, or the like.

Storage 1611 in one embodiment may include computer-readable or accessible media such as for example but not limited to a magnetic hard disk, a floppy disk, an optical disk, a flash memory drive, a smart card or any other suitable storage media equivalent for the storage for data. In one embodiment, storage 1611 may include removable media, read-only media, readable/writable media or the like. Some of the data may be written by a direct memory access process into memory 1605 during execution of software in computer system 1601. It is appreciated that software may reside in storage 1611 or memory 1605.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A computer-readable medium includes any mechanism that provides (i.e., stores) information in a form accessible by a computer (e.g., a personal computer, network device, personal digital assistant, manufacturing tool, any device with a set of one or more processors, etc.). For example, a computer-readable medium includes recordable and/or non-recordable media (e.g., read only memory (ROM), random access memory (RAM), magnetic disk storage media, optical storage media, flash memory devices, CD-ROMS, DVD-ROMS, network attached storages (NAT), etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method, comprising:
   simulating, using the computer, a first power supply design variables selected from a plurality of lists of power supply design variables;
   calculating, using the computer, a score of the first power supply design;
   determining, using the computer, whether the score of the first power supply design is better than a score of any power supply design included in a set of power supply designs; and if so replacing, using the computer, a power supply design having a worst score from the set of power supply designs with the first power supply design, wherein the first power supply design is one of a plurality of power supply designs, the method further comprising: repeating the simulating, the calculating, the determining and the replacing for each of the plurality of power supply designs, wherein the plurality of power supply designs includes a plurality of combinations of power supply design variables selected from the plurality of lists of power supply design variables, wherein each of the plurality of power supply designs includes a first output and a second output, wherein the plurality of lists of power supply design variables includes a first and second list of power supply design variables corresponding to the first output and a third and fourth list of power supply design variables corresponding to the second output, wherein the plurality of combinations of power supply design variables includes every possible combination of single power supply variables corresponding to the first output combined with every possible combination of single power supply variables corresponding to the second output.

2. The computer-implemented method of claim 1, wherein each of the plurality of combinations of power supply design variables includes a single power supply design variable selected from a first list of power supply design variables and a single power supply design variable selected from a second list of power supply design variables.

3. The computer-implemented method of claim 2, wherein the plurality of combinations of power supply design variables includes every possible combination of a single power supply design variable selected from each of the first and second lists.

4. The computer-implemented method of claim 2, further comprising generating the first list of power supply design variables by selecting viable power supply design variables from a database of power supply design variables.

5. The computer-implemented method of claim 1, wherein calculating a score of the first power supply design includes calculating the score of the first power supply design in response to a plurality of weighted factors.

6. The computer-implemented method of claim 5, wherein the weighted factors include at least two factors selected from the group consisting of: a ratio of the number of outputs of the first power supply design that are within specification to a number of outputs of the first power supply design that are not within specification; a core type of an energy transfer element included in the first power supply design; a type of stacking arrangement of the energy transfer element; an accuracy of an output ratio between outputs of the first power supply design; a forward current rating of an output diode included in the first power supply design; a reverse voltage rating of the output diode; and a diode type of the output diode.

7. The computer-implemented method of claim 1, wherein determining whether the score of the first power supply design is better than the score of any power supply design included in the set of power supply designs includes determining whether the score of the first power supply design is greater than the score of any power supply design included in the set of power supply designs.

8. The computer-implemented method of claim 1, further comprising inputting power supply specifications, wherein the first power supply design is scored in response to the inputted power supply specifications.

9. The computer-implemented method of claim 8, further comprising determining whether the first power supply design is a viable power supply design in response to the inputted power supply specifications.

10. The computer-implemented method of claim 1, wherein at least one of the plurality of lists of power supply design variables is a list of output diodes.

11. The computer-implemented method of claim 1, wherein at least one of the plurality of lists of power supply design variables is a list of secondary turns of an energy transfer element.

12. The computer-implemented method of claim 1, wherein at least one of the plurality of lists of power supply design variables is a list of core types and sizes of an energy transfer element.

13. The computer-implemented method of claim 1, further comprising outputting the set of power supply designs.

14. A computer-readable medium having stored thereon instructions that, if executed by a computer, will cause the computer to perform operations comprising:
   simulating a first power supply design in response to power supply design variables selected from a plurality of lists of power supply design variables;
   calculating a score of the first power supply design;
   determining whether the score of the first power supply design is better than a score of any power supply design included in a set of power supply designs; and if so
   replacing a power supply design having a worst score from the set of power supply designs with the first power supply design, wherein the first power supply design is one of a plurality of power supply designs, the medium further having stored thereon instructions that, if executed by the computer, will cause the computer to perform further operations, comprising:
   repeating the simulating, the calculating, the determining and the replacing for each of the plurality of power supply designs, wherein the plurality of power supply designs includes a plurality of combinations of power supply design variables selected from the plurality of lists of power supply design variables, wherein each of the plurality of power supply designs includes a first output and a second output, wherein the plurality of lists of power supply design variables includes a first and second list of power supply design variables corresponding to the first output and a third and fourth list of power supply design variables corresponding to the second output, wherein the plurality of combinations of power supply design variables includes every possible combination of power supply variables corresponding to the first output combined with every possible combination of power supply variables corresponding to the second output.

15. The computer-readable medium of claim 14, wherein each of the plurality of combinations of power supply design variables includes a single power supply design variable selected from a first list of power supply design variables and a single power supply design variable selected from a second list of power supply design variables.

16. The computer-readable medium of claim 15, wherein the plurality of combinations of power supply design variables includes every possible combination of a single power supply design variable selected from the each of the first and second lists.

17. The computer-readable medium of claim 14, wherein calculating a score of the first power supply design includes calculating the score of the first power supply design in response to a plurality of weighted factors.

18. The computer-readable medium of claim 17, wherein the weighted factors include at least two factors selected from the group consisting of: a ratio of the number of outputs of the first power supply design that are within specification to a number of outputs of the first power supply design that are not within specification; a core type of an energy transfer element included in the first power supply design; a type of stacking arrangement of the transformer; an accuracy of an output ratio between outputs of the first power supply design; a forward current rating of an output diode included in the first power supply design; a reverse voltage rating of the output diode; and a diode type of the output diode.

19. The computer-readable medium of claim 14, wherein determining whether the score of the first power supply design is better than the score of any power supply design included in the set of power supply designs includes determining whether the score of the first power supply design is greater than the score of any power supply design included in the set of power supply designs.

20. The computer-readable medium of claim 14, further having stored thereon instructions that, if executed by the computer, will cause the computer to perform further operations, comprising:
   inputting power supply specifications, wherein the first power supply design is scored in response to the inputted power supply specifications.

21. The computer-readable medium of claim 20, further having stored thereon instructions that, if executed by the computer, will cause the computer to perform further operations, comprising:
   determining whether the first power supply design is a viable power supply design in response to the inputted power supply specifications.

22. The computer-readable medium of claim 14, wherein at least one of the plurality of lists of power supply design variables is a list of output diodes.

23. The computer-readable medium of claim 14, wherein at least one of the plurality of lists of power supply design variables is a list of secondary turns of an energy transfer element.

24. The computer-readable medium of claim 14, wherein the at least one of the plurality of lists of power supply design variables is a list of core types and sizes of an energy transfer element.

25. A computer system, comprising:
   a processor, further comprising:
   a list component to have the processor generate a plurality of lists of power supply design variables;

a simulator component to have the processor simulate a first power supply design in response to power supply design variables selected from the plurality of lists of power supply design variables;

a scoring component to have the processor calculate a score of the first power supply design;

an output list component to have the processor maintain a set of power supply designs, wherein a power supply design having a worst score included in the set of power supply designs is replaced with the first power supply design if the score of the first power supply design is better than a score of any power supply design included in the set of power supply designs, wherein the first power supply design is one of a plurality of power supply designs and wherein the plurality of power supply designs includes a plurality of combinations of power supply design variables selected from the plurality of lists of power supply design variables, wherein each of the plurality of power supply designs includes a first output and a second output, wherein the plurality of lists of power supply design variables includes a first and second list of power supply design variables corresponding to the first output and a third and fourth list of power supply design variables corresponding to the second output, wherein the plurality of combinations of power supply design variables includes every possible combination of single power supply variables corresponding to the first output combined with every possible combination of single power supply variables corresponding to the second output.

26. The computer system of claim 25, wherein each of the plurality of combinations of power supply design variables includes a single power supply design variable selected from a first list of power supply design variables and a single power supply design variable selected from a second list of power supply design variables.

27. The computer system of claim 26, wherein the plurality of combinations of power supply design variables includes every possible combination of a single power supply design variable selected from each of the first and second lists.

28. The computer system of claim 25, wherein the scoring component is to further calculate the score of the first power supply design in response to a plurality of weighted factors.

29. The computer system of claim 28, wherein the weighted factors include at least two factors selected from the group consisting of: a ratio of the number of outputs of the first power supply design that are within specification to a number of outputs of the first power supply design that are not within specification; a core type of an energy transfer element included in the first power supply design; a type of stacking arrangement of the transformer; an accuracy of an output ratio between outputs of the first power supply design; a forward current rating of an output diode included in the first power supply design; a reverse voltage rating of the output diode; and a diode type of the output diode.

30. The computer system of claim 25, wherein the score of the first power supply design is better than the score of any power supply design included in the set of power supply designs if the score of the first power supply design is greater than the score of any power supply design included in the set of power supply designs.

31. The computer system of claim 25, further comprising a user interface component to input power supply specifications, wherein the scoring component calculates the score of the first power supply design in response to the inputted power supply specifications.

32. The computer system of claim 25, wherein at least one of the plurality of lists of power supply design variables is a list of output diodes.

33. The computer system of claim 25, wherein at least one of the plurality of lists of power supply design variables is a list of secondary turns of an energy transfer element.

34. The computer system of claim 25, wherein at least one of the plurality of lists of power supply design variables is a list of core types and sizes of an energy transfer element.

* * * * *